US008705014B2

(12) United States Patent
Bohl (10) Patent No.: US 8,705,014 B2
(45) Date of Patent: **\*Apr. 22, 2014**

(54) RADIATION SENSOR FOR DETECTING THE POSITION AND INTENSITY OF A RADIATION SOURCE

(75) Inventor: Benjamin Bohl, Berlin (DE)

(73) Assignee: Epcos AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,556

(22) Filed: Jan. 17, 2012

(65) Prior Publication Data

US 2012/0113408 A1 May 10, 2012

Related U.S. Application Data

(63) Continuation of application No. 12/816,081, filed on Jun. 15, 2010, now Pat. No. 8,149,389, which is a continuation of application No. PCT/DE2008/002124, filed on Dec. 17, 2008.

(30) Foreign Application Priority Data

Dec. 18, 2007 (DE) .......................... 10 2007 060 835

(51) Int. Cl.
*G01C 3/08* (2006.01)
(52) U.S. Cl.
USPC ......... 356/4.01; 356/3.01; 356/4.1; 356/5.01; 356/5.1
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| 3,838,277 | A | * | 9/1974 | Morgenstern et al. ........ 250/216 |
| 4,933,550 | A | | 6/1990 | Hegyi |
| 5,773,813 | A | * | 6/1998 | Duchon et al. ............. 250/206.2 |
| 5,805,275 | A | * | 9/1998 | Taylor .......................... 356/3.16 |
| 5,877,490 | A | | 3/1999 | Ramer et al. |
| 6,201,628 | B1 | * | 3/2001 | Basiji et al. ................ 359/212.1 |
| 7,235,765 | B2 | | 6/2007 | Clugston, Jr. |
| 2004/0217258 | A1 | | 11/2004 | Clugston, Jr. |
| 2007/0139642 | A1 | | 6/2007 | Ikeda et al. |
| 2008/0135726 | A1 | | 6/2008 | Balzer et al. |

FOREIGN PATENT DOCUMENTS

| CN | 1922046 | * | 2/2007 | ................ G01J 1/04 |
| CN | 1922046 A | | 2/2007 | |
| CN | 1975997 A | | 6/2007 | |
| DE | 10 2004 009 172 A1 | | 9/2005 | |

(Continued)

OTHER PUBLICATIONS

Ge, Q.-S., et al., "Research of vehicular laser passive reconnaissance warning system," Infrared and Laser Engineering, vol. 32, No. 3, Jun. 2003, 3 pages.

*Primary Examiner* — Luke Ratcliffe
(74) *Attorney, Agent, or Firm* — Slater & Matsil, L.L.P.

(57) ABSTRACT

A radiation sensor is provided for detecting the position and intensity of a radiation source. The radiation sensor includes at least one photodetector having a radiation-sensitive surface. Furthermore, the radiation sensor includes a reflector that reflects the radiation emitted by a radiation source from specific directions at least partly in the direction of the radiation-sensitive surface of the photodetector. The reflector is arranged on that side of the radiation sensor that is remote from the radiation source.

20 Claims, 4 Drawing Sheets

(56) References Cited

FOREIGN PATENT DOCUMENTS

| | | |
|---|---|---|
| EP | 0 350 866 B1 | 10/1993 |
| EP | 0 625 692 A1 | 11/1994 |
| EP | 1473552 * | 3/2004 ............... G01C 1/00 |
| EP | 1 473 552 A2 | 11/2004 |
| GB | 2 061 548 A | 5/1981 |
| JP | 62-084721 U | 5/1987 |
| JP | 02-087027 A | 3/1990 |
| JP | 07-043145 A | 2/1995 |
| JP | 2004-333495 A | 11/2004 |
| RU | 45544 U1 | 5/2005 |

* cited by examiner

RADIATION SENSOR FOR DETECTING THE POSITION AND INTENSITY OF A RADIATION SOURCE

This is a continuation application of U.S. application Ser. No. 12/816,081, which was filed on Jun. 15, 2010, which is a continuation of International Application No. PCT/DE2008/002124, filed Dec. 17, 2008, which designated the United States and was not published in English, and which claims priority to German Application No. 10 2007 060 835.9 filed Dec. 18, 2007. All of these applications are incorporated herein by reference.

TECHNICAL FIELD

The present invention relates generally to radiation sensors, and, in particular embodiments, to a radiation sensor for detecting the position and intensity of a radiation source.

BACKGROUND

The European patent document EP 0 350 866 B1 (U.S. equivalent U.S. Pat. No. 4,933,550) discloses a light sensor wherein a light diffuser for diffuse propagation of the light incident on the sensor is arranged between a photodetector and a light modulator.

SUMMARY OF THE INVENTION

In one aspect, the present invention specifies a radiation sensor whose output signal dependent on the position of the radiation source can be set particularly well.

A radiation sensor for detecting the position and intensity of a radiation source is specified. The sensor comprises at least one photodetector. A radiation-sensitive surface of the photodetector is arranged approximately perpendicularly with respect to the horizon of the radiation sensor. However, it is also possible for the photodetector to have an installation position that deviates from the perpendicular. The photodetector is preferably arranged with respect to the horizon of the radiation sensor in such a way that at least part of the light emitted by the radiation source from specific directions reaches the radiation-sensitive surface of the photodetector via the reflector.

The position of the radiation source is determined with reference to the horizon of the radiation sensor. The horizon is defined as the principal plane of the radiation sensor, the angles given by azimuth and elevation angle being defined with reference to the horizon of the radiation sensor. For the case where the radiation source is situated perpendicularly above the horizon and the photodetector is arranged perpendicularly, the radiation is therefore not directly incident on a radiation-sensitive surface of the photodetector of the radiation sensor.

The radiation sensor has a reflector, which, at specific irradiation angles, reflects the radiation emitted by the radiation source at least partly in the direction of the radiation-sensitive surface of the photodetector. The reflector preferably has a form corresponding approximately to that of a trough. However, it is also possible for the reflector to have any desired form suitable for reflecting the incident radiation from specific directions onto the photodetector. The walls of the reflector can have either a curved or a planar surface. The reflector can have any desired form suitable for ensuring that the light emitted by the radiation source arrives on the radiation-sensitive surface of the photodetector by means of reflection. The photodetector is arranged at least partly within the interior space determined by the reflector.

In a further embodiment, however, the photodetector can also be arranged completely above the reflector. The radiation sensor has a first side, through which the radiation is incident on the radiation sensor. A reflector is preferably arranged on a second side of the radiation sensor, said second side being remote from the radiation source, which reflector reflects the radiation emitted by the radiation source at least partly in the direction of the photodetector. The reflector is preferably arranged on that side of the radiation sensor which is remote from the light incidence side.

The radiation source is preferably the sun, the position of which given by azimuth and elevation angle and the intensity of which with respect to the radiation sensor are intended to be determined. The radiation sensor is also suitable, in particular, for detecting infrared radiation of the radiation source. The radiation emitted by the radiation source can therefore be radiation having a wavelength in the infrared spectral range and also light from the visible spectral range.

Furthermore, in one preferred embodiment, the radiation sensor is provided with a covering cap. The covering cap is preferably non-transparent to specific wavelengths of the radiation emitted by the radiation source.

In one preferred embodiment, the covering cap comprises a material which transmits radiation in the infrared range through the covering cap, but visible radiation is preferably kept away from the photodetectors for the most part by the covering cap.

In a manner governed by the material of the covering cap, the radiation emitted by the radiation source is at least partly influenced at the covering cap by light refraction. As a result of the phase transition from air to the covering cap, a refraction of the radiation takes place at the boundary.

In one preferred embodiment, the reflector is embodied as a part of an inner part or as an inner side of the housing of the radiation sensor.

In one preferred embodiment, a mount for the photodetectors is embodied as a part of an inner part of the housing of the radiation sensor. Preferably, at least one part of an inner part of the housing consists of reflector and mount for the photodetectors.

Preferably, the form and the material and/or the surface constitution of the reflector influence the signal output by the photodetectors for detecting the intensity and position of the radiation source.

Furthermore, the signal of the photodetectors for detecting the intensity and position of a radiation source is likewise influenced by the distance between the reflector and the radiation-sensitive surfaces of the photodetectors. In particular, the vertical distance—with respect to the horizon of the radiation sensor—between the reflector and the radiation-sensitive surface of the photodetectors is of non-negligible significance here.

In one preferred embodiment, the photodetectors have one or more devices that serve to influence the quantity of radiation incident on the radiation-sensitive surface of the photodetectors by shading.

In one preferred embodiment, structural or housing parts within the radiation sensor serve for shading the radiation-sensitive surface of the photodetectors from incident radiation or at least for partly shading the photodetectors.

In a further embodiment, a layer is applied to the radiation-sensitive surface of the photodetectors, which layer at least partly absorbs the radiation incident on the photodetectors, thereby influencing the quantity of radiation that impinges on the radiation-sensitive surface of the photodetectors.

In one preferred embodiment, the absorbent layer is not applied directly on the radiation-sensitive surface, but rather on the housing of the photodetector. In this embodiment, the absorbent layer is arranged at a certain distance from the radiation-sensitive surface of the photodetector.

In one preferred embodiment, the device for shading the photodetectors from direct or indirect radiation, that is to say including radiation emitted by the radiation source, which impinges on the radiation-sensitive surface of the photodetectors via the reflector, is arranged in such a way that the photodetectors are protected from incident radiation at least from a specific direction given by azimuth and elevation angle.

The subjects described above will be explained in greater detail on the basis of the following figures and exemplary embodiments.

BRIEF DESCRIPTION OF THE DRAWINGS

The drawings described below should not be interpreted as true to scale. Rather, for the sake of better illustration, individual dimensions may be illustrated in an enlarged, reduced or even distorted fashion. Elements which are identical to one another or which perform the same function are designated by the same reference symbols.

The following list of reference symbols may be used in conjunction with the drawings:

1 Radiation sensor
2 Photodetector
3 Reflector
4 Covering cap
5 Mount
7 Signal profile of the first photodetector
8 Signal profile of the second photodetector
9 Signal profile of two photodetectors
x x-axis
y y-axis
α Angle between the photodetectors 2

DETAILED DESCRIPTION OF ILLUSTRATIVE EMBODIMENTS

Figure 1:
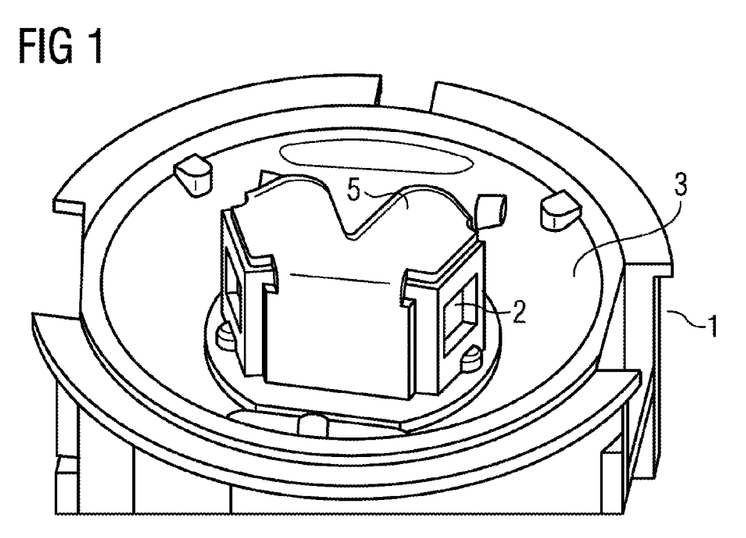
FIG. 1 shows a first embodiment of the radiation sensor in a three-dimensional view.

FIG. 1 shows a first embodiment of a radiation sensor 1 in a three-dimensional view. A mount 5 for at least one photodetector 2 is preferably situated in the central region of a reflector 3. In FIG. 1, two photodetectors 2 are arranged at the mount 5. The reflector 3 is at least partly curved in the region around the mount 5 for the photodetectors 2 in FIG. 1, but the reflector can also be embodied such that it is completely straight. The reflector 3 serves for reflecting the radiation emitted by a radiation source at least partly onto the radiation-sensitive surface of the photodetectors 2.

The radiation-sensitive surfaces of the photodetectors 2 are arranged perpendicularly with respect to a horizon running parallel to the upper edge of the reflector 3. Given an angle of incidence of 90° with respect to the horizon of the radiation sensor 1, this means that the radiation emitted by the radiation source preferably does not impinge directly on the photodetectors 2, but rather is guided by means of light reflection at the reflector 3 onto the photodetectors 2. Given an angle of incidence of the radiation that deviates from the orthogonal of the angle of incidence relative to the horizon of the radiation sensor 1, the radiation impinges at least partly directly on one of the two photodetectors 2. Depending on the embodiment, however, it is also possible for the radiation to impinge at least partly directly on both photodetectors 2. The shallower the angle of incidence, the more radiation impinges directly on the photodetectors 2. The radiation that impinges on the radiation-sensitive surfaces of the photodetectors 2 by means of reflection at the reflector 3 thus has a higher proportion at steep angles of incidence than at a shallow angle of incidence. However, it is also possible for the radiation to be incident on the radiation sensor at an angle at which no radiation impinges on the radiation-sensitive surface of the photodetectors.

The photodetectors 2 are oriented with their radiation-sensitive surface, preferably in two different directions, perpendicularly with respect to the horizon of the radiation sensor 1. However, it is also possible for the detectors to be arranged at an angle with respect to one another that lies between 0° and 360°. A detection of the position, determined by the azimuth angle and the elevation angle, and intensity of a radiation source is thus possible by means of an evaluation of the signals of the two photodetectors 2.

Figure 2:
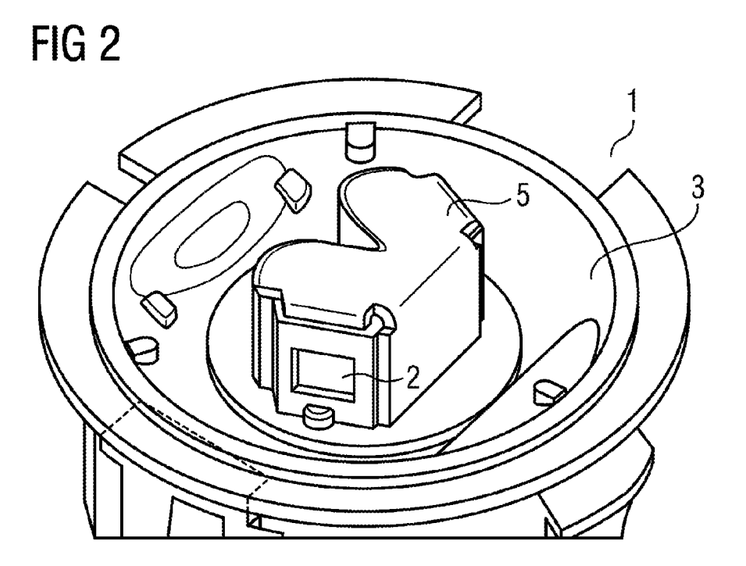
FIG. 2 shows an embodiment of the radiation sensor in a three-dimensional view in accordance with FIG. 1 that has been rotated by approximately 45° in the counterclockwise direction.

FIG. 2 shows a three-dimensional view of a radiation sensor 1 in accordance with FIG. 1 that has been rotated by approximately 45° in the counterclockwise direction. A mount 5 for two photodetectors 2 is preferably situated in the center of the reflector 3, said photodetectors being arranged, with respect to the horizon of the radiation sensor 1, perpendicularly thereto. In the case of radiation incident perpendicularly on the radiation sensor 1, the radiation is preferably guided onto the photodetectors 2 only via the reflector 3. In the case of a shallower angle of incidence of the radiation on the photodetectors 2, the radiation is detected in part directly by the photodetectors 2 and also in part indirectly via the reflector 3. The reflector 3 preferably has a uniform curvature in the region lying opposite the radiation-sensitive areas of the photodetectors 2.

Consequently, the radiation sensor 1 has at least two preferred directions for which the photodetectors 2 output a highest possible signal. Consequently the radiation sensor 1 is preferably axially symmetrical in the case of the embodiment shown with two photodetectors 2. In this case, the axis of symmetry preferably runs centrally between the two photodetectors 2 through the radiation sensor 1. By virtue of this arrangement shown in FIG. 2, in which the light-sensitive surfaces of the photodetectors 2 are arranged at an angle α of approximately 45° with respect to one another, it is possible, for example, that if the sun shines into an automobile from the left, the driver's side is cooled by an air-conditioning system.

If the sun shines into the automobile mirror-symmetrically from the right, then the passenger's side, for example, is cooled.

Figure 3:
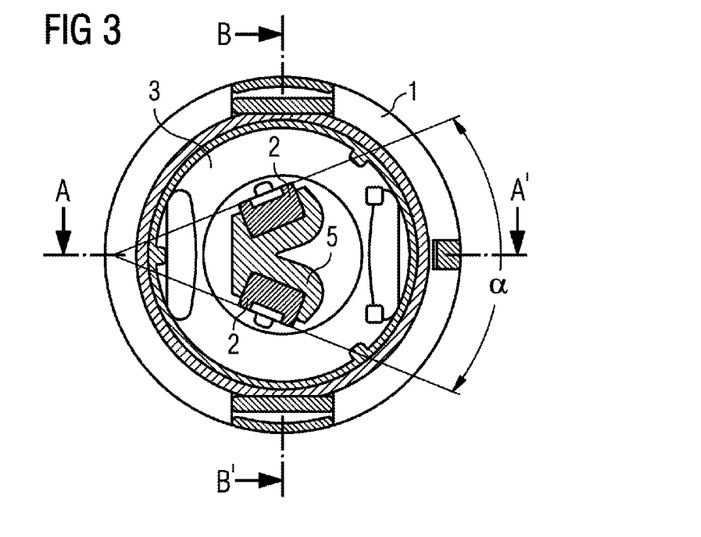
FIG. 3 shows a view of a radiation sensor from above.

FIG. 3 shows the radiation sensor 1 in a plan view. In the embodiment shown, the radiation sensor 1 has two photodetectors 2 preferably axially symmetrically with respect to the sectional line A-A'. The radiation-sensitive surfaces of the photodetectors 2 are preferably arranged at an angle α with respect to one another. The angle α has a value in the range of 0° to 360°. In one preferred embodiment, as illustrated in FIG. 3, the angle α between the two photodetectors 2 has a value of 45°. By virtue of this arrangement of the two photodetectors 2 with respect to one another, it is possible for the radiation sensor 1 to have a specific installation direction with regard to the subsequent use, e.g. for the control of an air-conditioning system in a motor vehicle.

Figure 4:
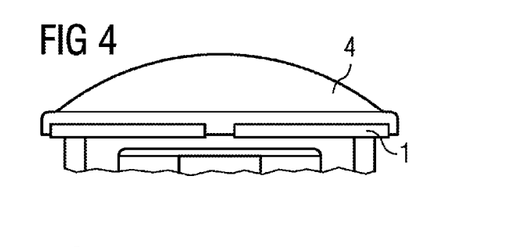
FIG. 4 shows an embodiment of the radiation sensor wherein the radiation sensor is provided with a covering cap.

FIG. 4 illustrates a side view of a radiation sensor 1 wherein the radiation sensor 1 is provided with a covering cap 4. The covering cap 4 protects the photodetectors 2 arranged in the interior of the radiation sensor 1, said photodetectors not being illustrated in this view, from damage. Furthermore, the covering cap also serves to ensure that the arrangement in the interior remains hidden from an observer. This makes it easier to adapt the radiation sensor to its surroundings, e.g. in the dashboard of an automobile. Furthermore, the covering cap 4 serves to transmit the radiation which is emitted by a radiation source and which has a specific wavelength lying within a specific range. Preferably, the covering cap 4 is transmissive to radiation in the infrared range. The covering cap 4 is at most partly transmissive, or even preferably approximately completely non-transparent to radiation having a different wavelength.

Figure 5:
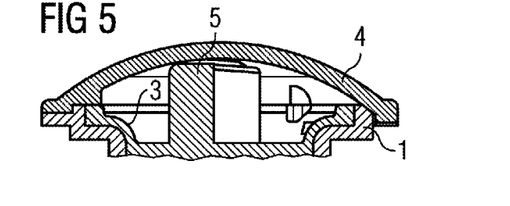
FIG. 5 shows a cross section of the radiation sensor from FIG. 4, along the sectional line A-A.

FIG. 5 shows a sectional view of the radiation sensor 1 in accordance with FIG. 3 along the sectional line A-A'. In this embodiment, the radiation sensor 1 is illustrated with a covering cap 4, which is not illustrated in FIG. 3. The radiation sensor 1 has a preferably curved reflector 3. The reflector 3 has regions which face the photodetectors 2 and reflect the radiation in the direction of the photodetectors 2. The reflector can also have straight areas and edges. Any form of the reflector which leads to the desired characteristic is possible.

Figure 6:
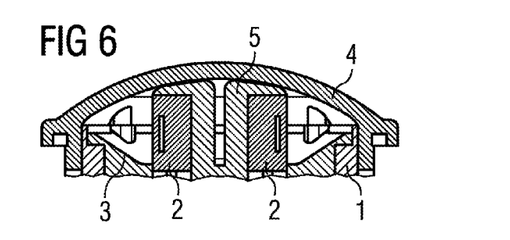
FIG. 6 shows a cross section of a radiation sensor from FIG. 4, along the sectional line B-B.

FIG. 6 shows a side view of the radiation sensor 1 in accordance with FIG. 3 along the section axis B-B'. In this embodiment, as in FIG. 5, the radiation sensor 1 is illustrated with a covering cap 4, which is not shown in FIG. 3. The radiation sensor 1 has a preferably curved reflector 3. A mount 5 is arranged centrally in the reflector 3, at least two photodetectors 2 being arranged at said mount. The region of the reflector 3 which faces the photodetectors 2 has an oblique area, as illustrated in FIG. 6. However, the reflector 3 can also be curved or bent in some other way or else have edges. The detection of the position given by azimuth and elevation angle and the intensity of a radiation source can be influenced by the form of the reflector 3.

The reflector 3 is preferably embodied in such a way that the radiation emitted by the radiation source from specific directions is reflected at the reflector 3 and passes to the radiation-sensitive surfaces of the photodetectors 2. For radiation which impinges on the radiation sensor 1 at a shallow angle of incidence, the photodetectors 2 are preferably arranged in such a way that a part of the radiation-sensitive surface of the photodetectors 2 projects beyond the edge of the reflector 3. As a result, the radiation emitted by a radiation source, in the case of a shallow angle of incidence, can impinge directly on the radiation-sensitive surfaces of the photodetectors 2. In the embodiment shown, at least half of the radiation-sensitive area of the photodetectors 2 projects beyond the edge of the reflector 3. However, the reflector 3 can also be arranged completely below the photodetectors 2.

Figure 7:
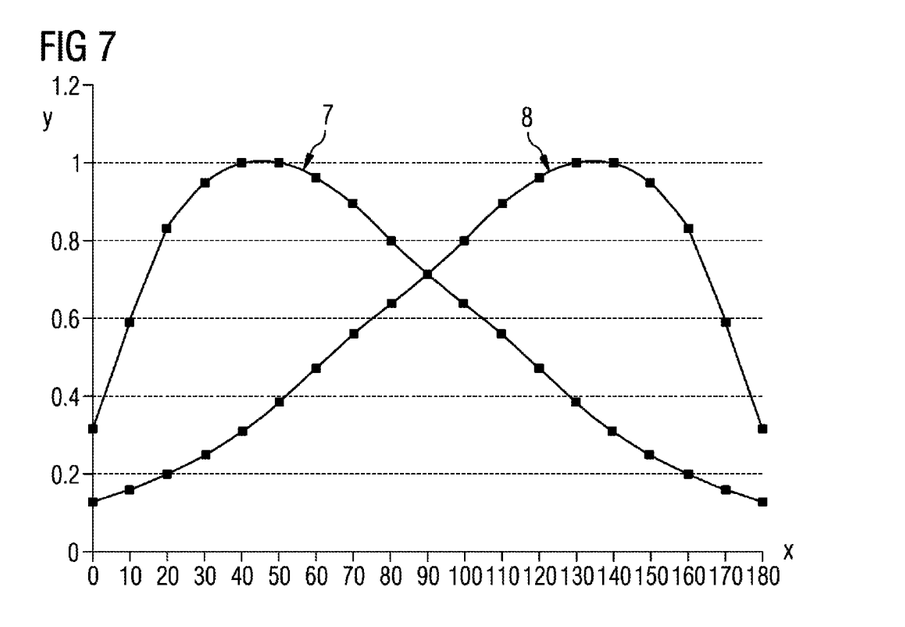
FIG. 7 shows by way of example the dependence of the output signals of the photodetectors on the elevation angle of the radiation respectively impinging on the two photodetectors, given an azimuth angle of −90°.

FIG. 7 shows the respective dependence of the measurement signal of two photodetectors on the angle of incidence of the radiation impinging on the radiation-sensitive surfaces of the photodetectors, with respect to the horizon of the radiation sensor given an azimuth angle of −90°, that is to say that the radiation source moves from the left-hand side over the sensor to the right-hand side. A radiation sensor as described in FIGS. 1 to 6 was used for the measurement curves in FIGS. 7, 8 and 9. An embodiment comprising two photodetectors was used, the radiation-sensitive surfaces of which are arranged at an angle of 45° with respect to one another.

FIG. 7 shows by way of example the profile of the standardized measurement signal of the two photodetectors, which is plotted on the y-axis. On the x-axis, the elevation angle of the radiation impinging on the two photodetectors with respect to the horizon of the radiation sensor is represented in degrees. In this case, 0° and 180° indicate an elevation angle at which the radiation is incident on the radiation sensor from the left and from the right, respectively. At an angle of 90°, the radiation impinges perpendicularly on the radiation sensor; in this case, the radiation preferably impinges on the photodetectors completely by reflection at the reflector. The azimuth angle is −90° in the case of this figure.

The curve profile 7 of a first photodetector, represented by a curve with points, has a maximum signal strength of 100% at an angle of incidence of approximately 45°. At an elevation angle of 0°, the photodetector has a signal strength of approximately 30%. Between an elevation angle of 0° and 45°, the curve 7 rises steeply. Between 45° and 180°, the curve 7 has a profile that is approximately linear. At an elevation angle of 180°, the signal strength is approximately 10%. The curve profile 8 of a second photodetector, represented by small boxes, has a profile that is mirror-symmetrical at an elevation angle of 90°. At an angle of incidence of 0°, the curve of the second photodetector 8 has its absolute minimum of approximately 10% signal strength. The curve 8 rises approximately linearly to a maximum of 100% up to an elevation angle of 135°. Between an elevation angle between 135° and 180°, the curve 8 falls steeply to a value of approximately 30% signal strength.

Figure 8:
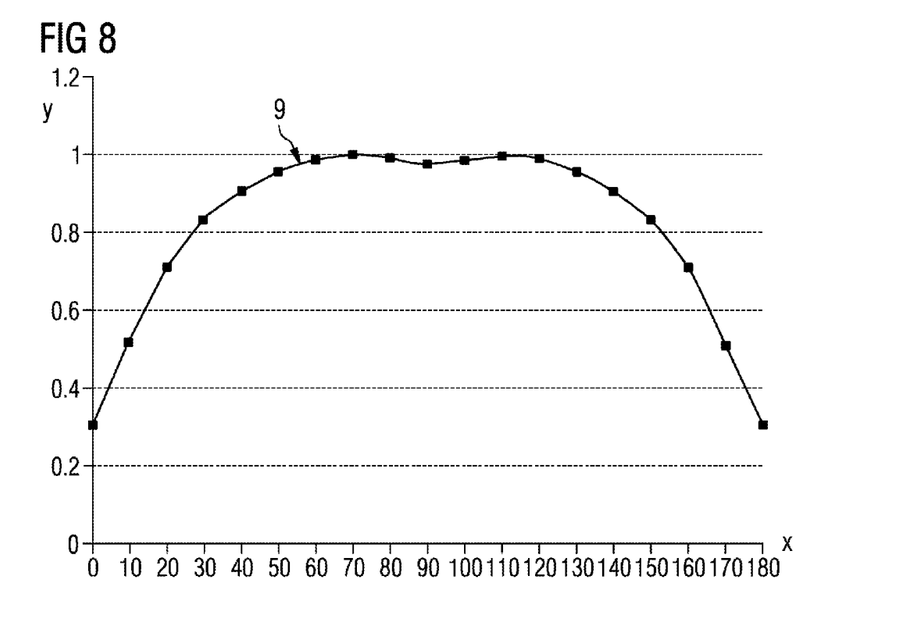
FIG. 8 shows by way of example the dependence of the added output signals of the photodetectors on the elevation angle of the radiation impinging on the two photodetectors.

FIG. 8 shows by way of example the dependence of the signal strength output by two photodetectors relative to the angle of incidence of the radiation impinging on the photodetectors, with respect to the horizon of the radiation sensor. The azimuth angle is −90° in the case of this figure. The y-axis indicates the standardized signal strength. On the x-axis, the elevation angle of the radiation impinging on the two photodetectors with respect to the horizon of the radiation sensor is represented in degrees. In this case, 0° and 180° indicate an elevation angle at which the radiation impinges on the radiation sensor parallel to the horizon of the radiation sensor. The curve 9 shows the sum of the signals of the two photodetectors in accordance with FIG. 7. At an elevation angle of 0° and 180°, the curve 9 has in each case an absolute minimum of approximately 30% signal strength. The curve 9 has two local maxima at 70° and 110° elevation angle with 100% signal strength. Lying between these two maxima is a local minimum at an elevation angle of 90° with a signal strength of approximately 98%.

Figure 9:
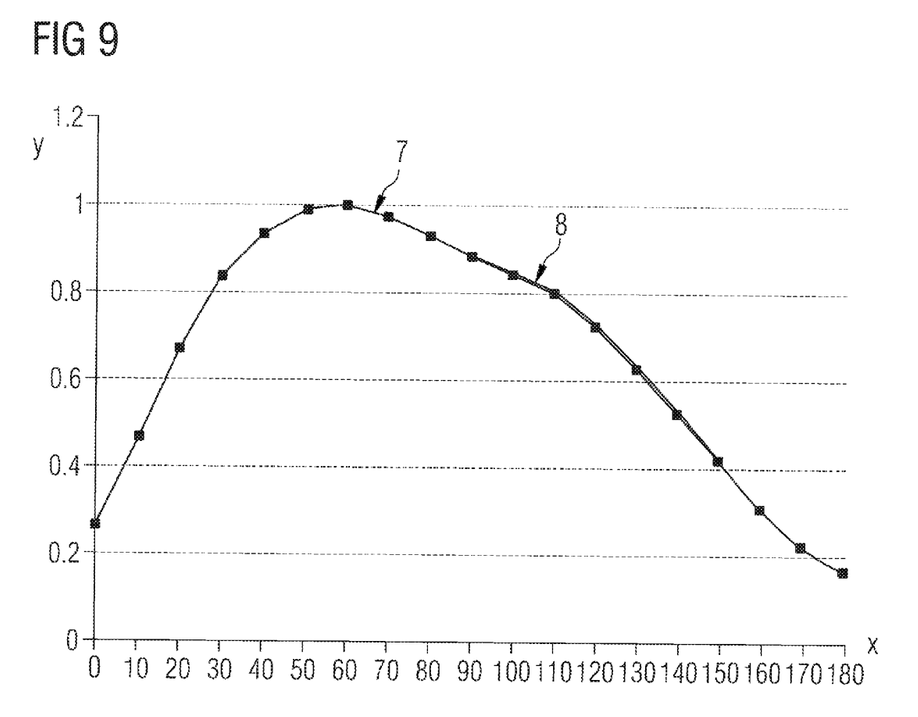
FIG. 9 shows by way of example the dependence of the output signals of the photodetectors on the elevation angle of the radiation respectively impinging on the two photodetectors, given an azimuth angle of 0°.

FIG. 9 shows by way of example the dependence of the signal strength output by two photodetectors relative to the elevation angle of the radiation impinging on the photodetectors, with respect to the horizon of the radiation sensor. The y-axis indicates the standardized signal strength. On the x-axis, the elevation angle of the radiation impinging on the two photodetectors with respect to the horizon of the radiation sensor is represented in degrees. In this case, 0° and 180° indicate an elevation angle at which the radiation impinges on the radiation sensor parallel to the horizon of the radiation sensor. The azimuth angle is 0° in the case of this figure. The signal profile of the curves 7 and 8 are almost identical in the case of this azimuth angle of 0°. The curves 7 and 8 have their maximum at an elevation angle of approximately 60°. The signal strength has approximately 30% of the maximum strength at an elevation angle of 0°. From 60° to 110°, the signal strength slowly falls from 100% to approximately 80%. From an elevation angle between 110° and 180°, the signal strength falls more steeply to a value of approximately 18% at 180° elevation angle.

The embodiment illustrated in the figures makes it possible to specify a radiation sensor having a smallest possible structural height. In particular, the construction described above makes it possible to realize a radiation sensor wherein particularly the covering cap has a small structural height.

Although only a limited number of possible development of the invention have been able to be described in the exemplary embodiments, the invention is not limited thereto. It is possible, in principle, to use more than one photodetector, with the result that it is possible to determine a more exact position of the radiation source.

The invention is not limited to the number of elements illustrated.

The description of the subjects specified here is not limited to the individual specific embodiments; rather, the features of the individual embodiments can be combined with one another in any desired manner insofar as is technically practical.

What is claimed is:

1. A radiation sensor for detecting a position and intensity of a radiation source, the radiation sensor comprising:
    a photodetector having a radiation-sensitive surface, wherein the radiation-sensitive surface of the photodetector is arranged approximately perpendicularly with respect to a horizon of the radiation sensor; and
    a reflector configured to reflect radiation emitted by the radiation source from specific directions at least partly in a direction of the radiation-sensitive surface of the photodetector, wherein the reflector is arranged on a side of the radiation sensor that is remote from a light incidence side wherein the photodetector is arranged at least partially within an interior space defined by the reflector, and wherein the reflector has a form corresponding to a trough.

2. The radiation sensor as claimed in claim 1, further comprising a covering cap adjacent the photodetector.

3. The radiation sensor as claimed in claim 2, wherein the covering cap is at least partly non-transparent to specific wavelengths of the radiation emitted by the radiation source.

4. The radiation sensor as claimed in claim 2, wherein the radiation emitted by the radiation source is at least partly influenced at the covering cap by light refraction.

5. The radiation sensor as claimed in claim 1, wherein the reflector is embodied as a part of a housing of the radiation sensor.

6. The radiation sensor as claimed in claim 1, further comprising a mount for the photodetector, the mount being embodied as a part of a housing of the radiation sensor.

7. The radiation sensor as claimed in claim 1, wherein a signal output by the photodetector for detecting the intensity and position of the radiation source is dependent on the form, a material and/or on a surface constitution of the reflector.

8. The radiation sensor as claimed in claim 7, wherein the signal output by the photodetector for detecting the intensity and position of the radiation source is dependent on the form, the material and on the surface constitution of the reflector.

9. The radiation sensor as claimed in claim 1, wherein a signal of the photodetector for detecting the intensity and position of the radiation source is dependent on a distance between the reflector and the radiation-sensitive surface of the photodetector.

10. A radiation sensor for detecting a position and intensity of a radiation source, the radiation sensor comprising:
    a photodetector having a radiation-sensitive surface; and
    a reflector configured to reflect radiation emitted by the radiation source from specific directions at least partly in a direction of the radiation-sensitive surface of the photodetector, wherein the reflector is arranged on a side of the radiation sensor that is remote from a light incidence side and wherein the photodetector is arranged at least partially within an interior space defined by the reflector;
    wherein the photodetector comprises at least one device that influences a quantity of radiation incident on the radiation-sensitive surface of the photodetector from the specific directions.

11. The radiation sensor as claimed in claim 10, wherein the at least one device is embodied in the form of additional structural parts within the radiation sensor.

12. The radiation sensor as claimed in claim 10, wherein the at least one device is embodied in the form of a layer for absorbing the incident radiation on the radiation-sensitive surface of the photodetector.

13. The radiation sensor as claimed in claim 10, wherein the at least one device protects the radiation-sensitive surfaces of the photodetector from direct or indirect radiation from at least one specific direction.

14. The radiation sensor as claimed in claim 10, wherein the at least one device is embodied in the form of at least one housing part of the radiation sensor.

15. The radiation sensor as claimed claim 1, wherein the reflector has a uniform surface in a region lying opposite the radiation-sensitive surface of the photodetectors.

16. A radiation sensor for detecting a position and intensity of a radiation source, the radiation sensor comprising:
    a photodetector having a radiation-sensitive surface; and
    a reflector configured to reflect radiation emitted by the radiation source from specific directions at least partly in a direction of the radiation-sensitive surface of the photodetector, wherein the reflector is arranged on a side of the radiation sensor that is remote from a light incidence side and wherein the photodetector is arranged at least partially within an interior space defined by the reflector;
    wherein the photodetector is one of two photodetectors, each having a radiation-sensitive surface, wherein the radiation-sensitive surfaces of the two photodetectors are arranged at an angle of 45° with respect to one another.

17. The radiation sensor as claimed in claim 1, wherein the reflector is embodied as an inner part of the radiation sensor.

18. The radiation sensor as claimed in claim 1, wherein the radiation sensor is configured such that its output signal is dependent on the position of the radiation source.

19. The radiation sensor as claimed in claim 1, wherein the radiation sensor is configured to be used to control an air-conditioning system.

20. The radiation sensor as claimed in claim 1, wherein the photodetector is one of a plurality of photodetectors, each photodetector comprising at least one device that influences a quantity of radiation incident on the radiation-sensitive surfaces of the photodetectors from the specific directions.

* * * * *